(No Model.)
C. H. THOMPSON.
SECONDARY BATTERY.
No. 406,969. Patented July 16, 1889.
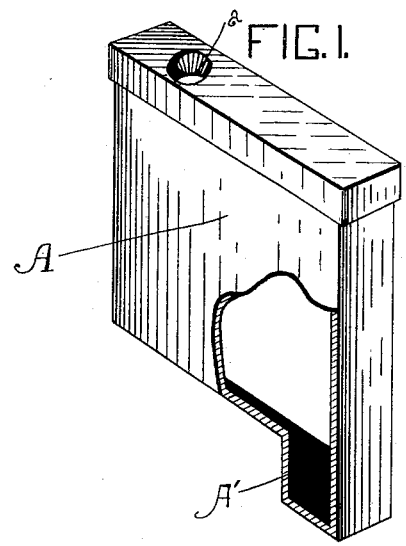
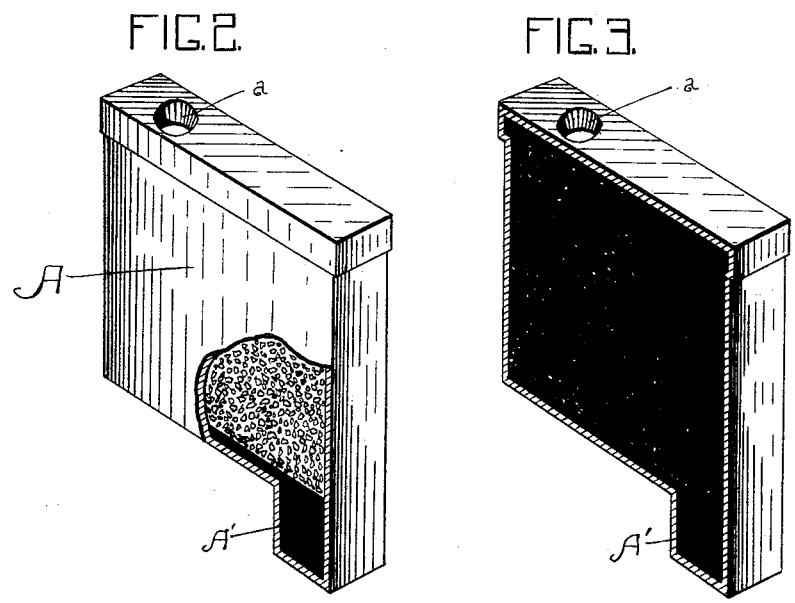
WITNESSES
C. S. Champion.
F. B. Kiefer
INVENTOR
C. H. Thompson,
by R. S. Dyrenforth.
his Attorney

UNITED STATES PATENT OFFICE.

CHARLES H. THOMPSON, OF DETROIT, MICHIGAN, ASSIGNOR TO THE WOODWARD ELECTRICAL COMPANY, OF SAME PLACE.

SECONDARY BATTERY.

SPECIFICATION forming part of Letters Patent No. 406,969, dated July 16, 1889.

Application filed January 7, 1889. Serial No. 295,631. (No model.)

*To all whom it may concern:*

Be it known that I, CHARLES HENRY THOMPSON, a citizen of the United States, residing at Detroit, in the county of Wayne and State of Michigan, have invented certain new and useful Improvements in Secondary Batteries; and I do hereby declare the following to be a full, clear, and exact description of the invention, such as will enable others skilled in the art to which it appertains to make and use the same.

This invention relates to electrodes for secondary batteries.

The object is, in a ready and efficient manner, to make electrodes for batteries, particularly for secondary electric batteries.

With this object in view the invention consists in producing a support for an electrode, eventually to be formed and set up as an electrode for a secondary battery, which consists in first making a portion of a suitable metallic substance with a solid projection for a terminal, then producing the rest of the metal in a highly porous or cellular body by running the metallic substance among a refractory mass, afterward to be removed, the entire metallic substance, with the terminal, being made integral.

In the accompanying drawings, Figure 1 represents a perspective view of a mold for casting a support for an electrode in accordance with my invention. Fig. 2 represents a perspective view of a mold, the lower portion thereof being broken away to show the metallic substance as placed in the mold in accordance with the first step of my improved method. Fig. 3 is a sectional view showing the interior of the mold filled with refractory substance.

In a patent granted November 6, 1888, to my present assignee, the Woodward Electrical Company, and numbered 392,573, there is described a method of making a support for an electrode for secondary batteries by molding a suitable metallic substance in contact with a body or mass of such nature that the metallic substance in molding penetrates the body or mass afterward to be removed, leaving the metallic substance in a highly-porous condition, excluding the body or mass from a portion of the mold, whereby a part of the metallic substance will be cast solid.

The present application differs from the patent referred to in that by the process described in the patent the terminal is made last, whereas by the procedure of the present application the terminal is made first, and by the procedure of the patent it is necessary to exclude by separate means the porous substance from the part of the mold which is to produce the solid terminal, whereas by the procedure of the present application the presence of the terminal itself will exclude the penetrable mass, or the mass may be in the part to be taken by the terminal, being floated out in production by the denser mass of which the support is produced.

In carrying out the invention, the mold A, which is provided at its lower end with a hollow projection A', has introduced into it through the spruc-hole *a* in the top a sufficient quantity of the metallic substance of which the support is to be formed to fill the opening in the hollow projection and to form a thin plate along the bottom of the mold integral with the projection formed in the hollow portion A'. This plate is preferably not thicker than one-quarter of an inch, though under some circumstances it may be thinner or much thicker, as required.

When the thin plate and projection has been formed, the entire interior of the mold is filled with a highly-refractory penetrable mass, which is of a nature to permit its removal by water. The substance which I prefer to use is rock-salt, since this, while highly refractory, and thus not destructible by the molten metal, is readily removed from the casting afterward by water, the water readily dissolving it out.

When the mold is filled with the refractory substance, molten metal is introduced from the top, readily running into the interstices of the mass and forming a highly-porous body with cells communicating one with another, forming tortuous ducts throughout. This porous body will be an integral body with the thin plate and projection first made, thus presenting, after the casting is removed from the mold and the refractory material removed, a holder for an electrode, formed with the desired porous body having the integral solid terminal and plate. Of course the mold may be of any requisite shape to give the support at once the exact size and shape desired; or it may be larger, and the resulting casting be sawed or otherwise divided into plates of the desired size and shape. This last procedure is preferable, as it is more economical.

In order to insure the molten metal through the entire body of the mass in the mold and to all parts of the mold, it is preferred that the refractory substance be hot while the metal is being poured into the mold.

While I have thus particularly described one method of making the support I do not wish to be limited to the specific steps set forth, as I may modify the procedure by first introducing the refractory material, entirely filling the mold and the hollow projection, and introducing the molten metal, gradually floating the refractory material from the hollow projection, allowing the formation of the solid terminal.

The method hereinbefore particularly described is, however, preferably employed.

Having thus fully described my invention, what I claim as new, and desire to secure by Letters Patent, is—

The method of producing a support for an electrode, which consists in first making a portion of a suitable metallic substance with a solid projection for a terminal, then producing the rest of the metal in a highly porous or cellular body by running the metallic substance among the refractory mass afterward to be removed, substantially as described.

In testimony whereof I affix my signature in presence of two witnesses.

CHARLES H. THOMPSON.

Witnesses:
FRANK B. PRESTON,
C. A. BEGLE.